United States Patent
Burckart et al.

(10) Patent No.: US 9,282,184 B2
(45) Date of Patent: Mar. 8, 2016

(54) MANAGING AND STORING ELECTRONIC MESSAGES DURING RECIPIENT UNAVAILABILITY

(71) Applicant: International Business Machines Corporation, Armonk, NY (US)

(72) Inventors: Erik J. Burckart, Raleigh, NC (US); Andrew J. Ivory, Wake Forest, NC (US); Aaron K. Shook, Raleigh, NC (US); David M. Stecher, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 13/779,796

(22) Filed: Feb. 28, 2013

(65) Prior Publication Data

US 2014/0244961 A1    Aug. 28, 2014

(51) Int. Cl.
| | | |
|---|---|---|
| *G06F 12/00* | (2006.01) | |
| *H04M 3/42* | (2006.01) | |
| *G06Q 10/10* | (2012.01) | |

(52) U.S. Cl.
CPC ............... *H04M 3/42* (2013.01); *G06Q 10/107* (2013.01)

(58) Field of Classification Search
CPC .............................. G06F 12/023; G06F 3/0644
See application file for complete search history.

(56) References Cited

U.S. PATENT DOCUMENTS

| | | | |
|---|---|---|---|
| 5,930,337 A | 7/1999 | Mohler | |
| 2007/0294206 A1* | 12/2007 | Korman et al. | 707/1 |
| 2008/0229045 A1* | 9/2008 | Qi | 711/170 |
| 2011/0153753 A1* | 6/2011 | Childress et al. | 709/206 |

OTHER PUBLICATIONS

Lazynetworkadmin.com, "Change Out of Office for Another User | LazyNetworkAdmin" LazyNetworkAdmin.com [online], [retrieved on Nov. 20, 2012]. Retrieved from the Internet <URL: http://www.lazynetworkadmin.com/knowledgebase-mainmenu-6/2-windows/90-change-out-of-office-for-another-user>.

* cited by examiner

*Primary Examiner* — Gurtej Bansal
(74) *Attorney, Agent, or Firm* — Jason H. Sosa; William H. Hartwell

(57) ABSTRACT

A method for managing storage space for electronic messages. A computer receiving a selected time period in which a user of a messaging program will not be able to access electronic messages through the messaging program. The computer estimating, by one or more computer processors, an amount of storage space required to store electronic messages received during the selected time period. The computer determining, by one or more computer processors, that an unused portion of storage space allocated to the user is less than the estimated storage space required. The computer notifying the user that the unused portion of storage space allocated to the user is less than the estimated storage space required.

9 Claims, 4 Drawing Sheets

MANAGING AND STORING ELECTRONIC MESSAGES DURING RECIPIENT UNAVAILABILITY

FIELD OF THE INVENTION

The present invention relates generally to the field of electronic mailing and more particularly to managing and storing electronic mail during recipient unavailability.

BACKGROUND OF THE INVENTION

An electronic messaging system typically allocates message inboxes of fixed size to the users of the messaging service. This is due in part to the limited amount of storage space available on a server computer to store all exchanged messages. Typically, modern corporations impose storage limits per user to limit the number of servers required and to reduce the cost of maintaining said servers. In the event a user receives a large number of messages or the user does not regularly retrieve received messages, there is the possibility the capacity of the user's mailbox will be exceeded and the mailbox will not be able to receive any incoming mail. As a result, the sender of the message loses the ability to leave further messages for the intended user.

Many voice and/or multimedia messaging systems have warning announcements that are provided to the user to advise them when the maximum storage capacity of the mailbox is being approached. However, such a feature is irrelevant if the user is not readily available to access the mailbox displaying the announcement. As a result, the maximum storage capacity of the mailbox can be reached during the time period when the user is not readily available to access the mailbox and any additional incoming mail will not be received.

SUMMARY

Embodiments of the present invention disclose a method, computer program product, and computer system for managing storage space for electronic messages. A computer receiving a selected time period in which a user of a messaging program will not be able to access electronic messages through the messaging program. The computer estimating, by one or more computer processors, an amount of storage space required to store electronic messages received during the selected time period. The computer determining, by one or more computer processors, that an unused portion of storage space allocated to the user is less than the estimated storage space required. The computer notifying the user that the unused portion of storage space allocated to the user is less than the estimated storage space required.

DETAILED DESCRIPTION

Figure 1:
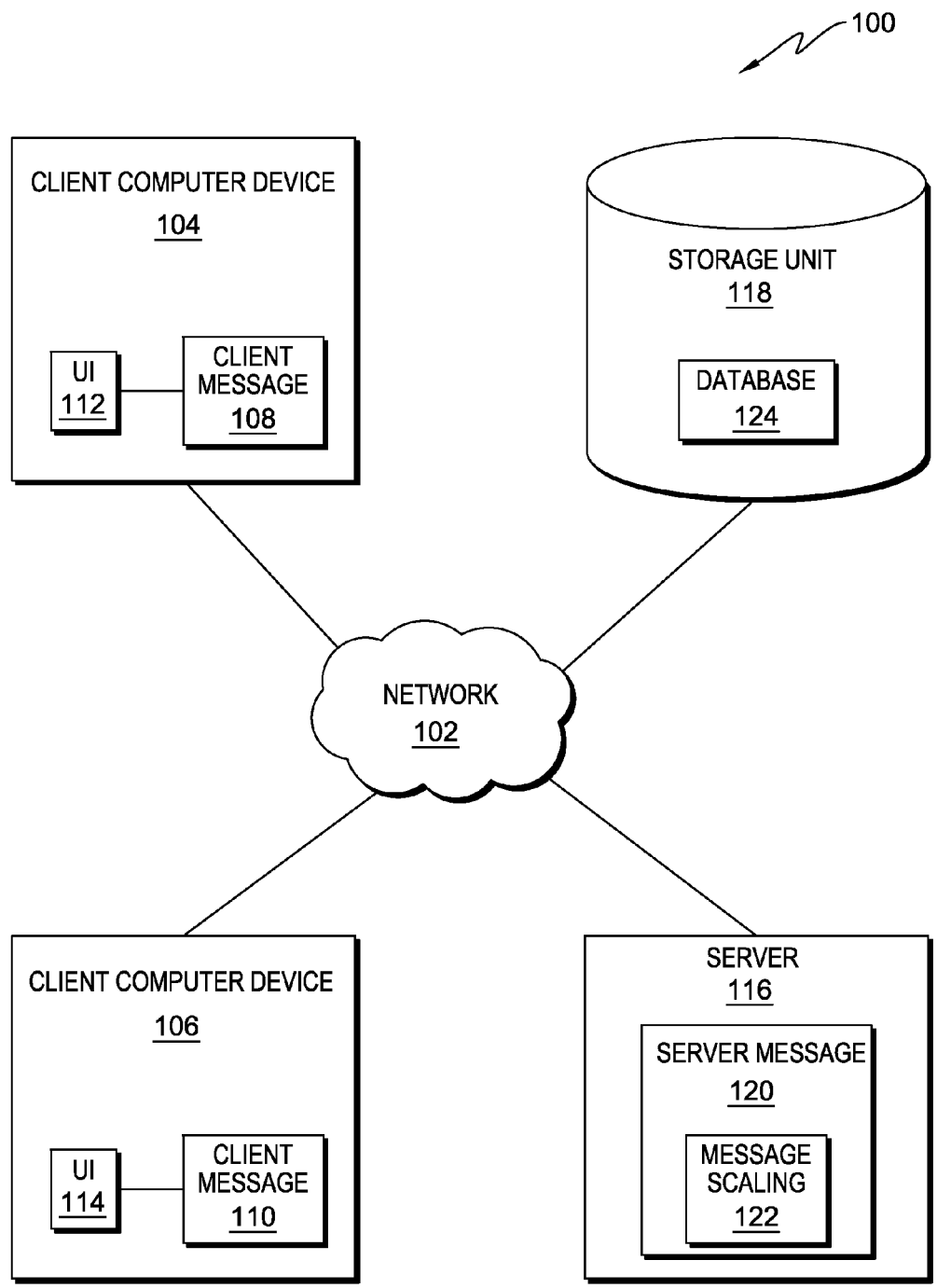
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 is a functional block diagram illustrating a distributed data processing environment, generally designated 100, in accordance with an embodiment of the present invention.

Distributed data processing environment 100 is a network of computers in which the illustrative embodiment can be implemented. Distributed data processing environment 100 contains network 102, which is the medium used to provide communication links between various components connected together within distributed data processing environment 100. In this embodiment, client computer device 104 (i.e., email sender) and client computer device 106 (i.e., email recipient) connect to network 102. Client computer device 104 and client computer device 106 may be a laptop computer, tablet computer, netbook computer, personal computer (PC), a desktop computer, a personal digital assistant (PDA), a smart phone, or any device capable of sending or receiving electronic messages. Examples of electronic messages may include but are not limited to, an email message, an Instant Message, or a text message.

In various embodiments of the present invention, client computer devices 104 and 106 contain client message programs 108 and 110 respectively. Each user of client computer devices 104 and 106 can communicate with client message programs 108 and 110 through user interfaces 112 and 114 respectively. User interfaces 112 and 114 can be, for example, graphical user interfaces (GUIs) or web user interfaces (WUIs).

Distributed data processing environment 100 also includes server 116 and storage unit 118, both of which are also connected to network 102. In this example, server 116 contains server message program 120 that communicates with client message programs 108 and 110. Server message program 120 and client message programs 108 and 110 are part of the same messaging system and are capable of sending and receiving electronic messages via network 102, but each have different locales. Examples of messaging systems to which server message program 120 and client message program 108 and 110 belong are: Lotus Notes®, Gmail®, Yahoo!® Mail and AOL® Mail. Contained within server message program 120 is message scaling program 122. Storage unit 118 stores various information used in client message programs 108 and 110 as well as server message program 120 and message scaling program 122. Various information can be preference settings, email messages stored in an inbox, archived email messages or any other information pertaining to client message programs 108 and 110, server message program 120 and message scaling program 122. Database 124, located in storage unit 118 contains the space allocated for each recipient's inbox.

Figure 2:
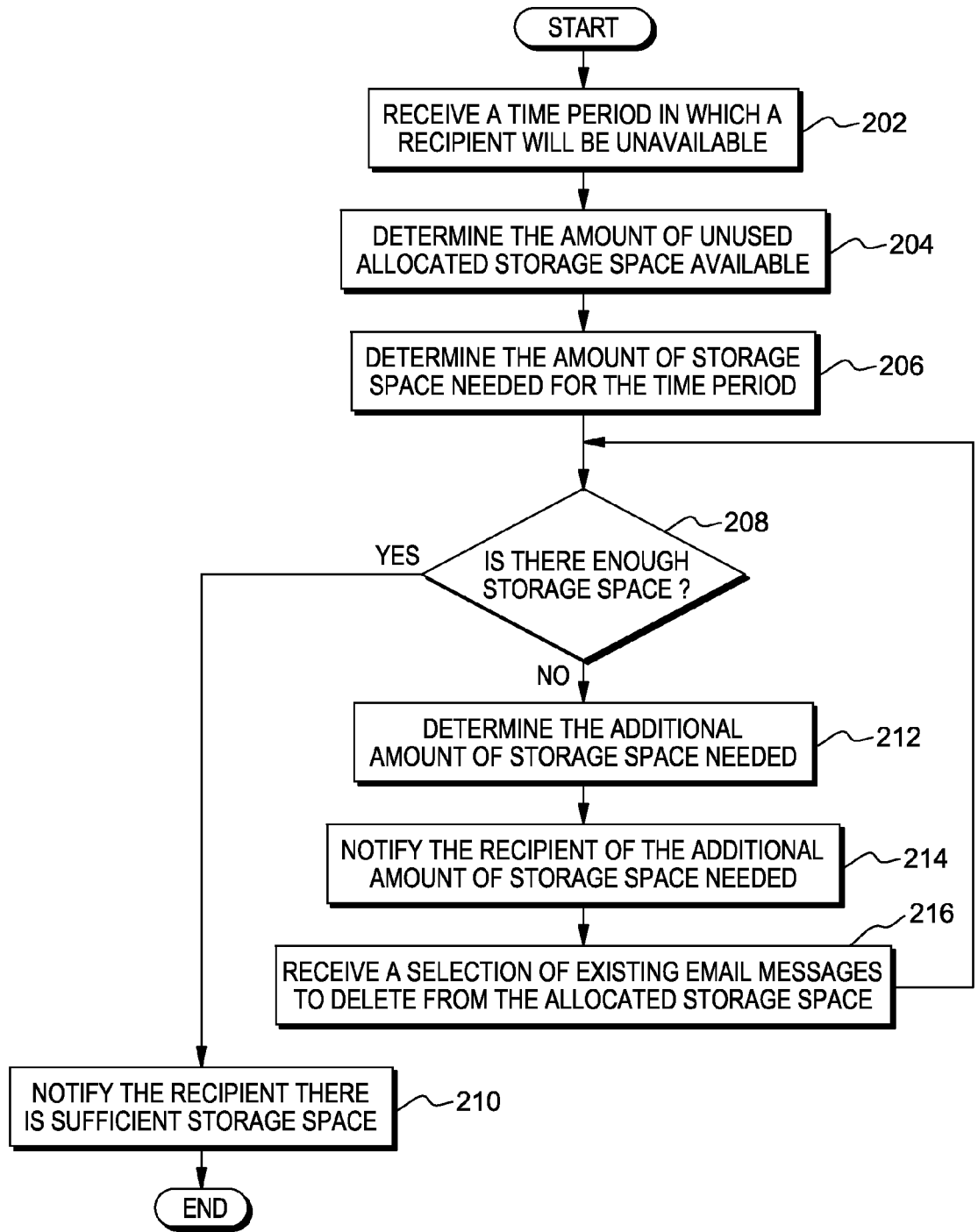
FIG. 2 is a flowchart depicting operational steps of a message scaling program for scaling an inbox in a messaging program for a recipient of an email, according to an exemplary embodiment of the present invention.

FIG. 2 is a flowchart, depicting operational steps of message scaling program 122 for scaling an inbox in a messaging program for a recipient of an email, according to an exemplary embodiment of the present invention.

In this example, a recipient operating client computer device 106 is scheduled to be "out of the office" and unavailable to access their email messages in an associated inbox in client message program 110. While the recipient is unavailable to access their associated inbox to read email messages, the number of unread email messages accumulates in the inbox. Every unread email message requires storage space in database 124. However, client message program 110 has an allocated amount of storage space in database 124 for the recipient to store email messages, whether the email message is archived by the recipient or stored as an unread email message in the recipient's inbox. In the event the allocated storage space in database 124 for the recipient's inbox is fully utilized, any incoming email messages are intercepted and returned to the sender. Prior to the recipient becoming unavailable to access their associated inbox in client message program 110 to read email messages, the recipient establishes a time period in which the unread email messages will accumulate (e.g., "time out of the office").

Message scaling program 122 receives a time period in which the recipient will be unavailable to access their associated inbox (step 202). The recipient, through user interface 114, selects the time period on client message program 110, upon which the information is sent to message scaling program 122 through network 102. The selection of the time period can be performed by the recipient updating their calendar in client message program 110. In another embodiment, the selection of the time period can be performed by message scaling program 122 prompting a calendar for the recipient to select the days on which the inbox will not be accessed. In this example, the selected time period in which the recipient will be unavailable to access their associated inbox is a single work week.

Message scaling program 122 determines the amount of unused allocated storage space available in database 124 (step 204). The unused allocated storage space available can be determined by comparing how much total allocated storage space the recipient has in database 124 with how much of the allocated storage space is currently being used by the recipient's inbox. The allocated storage space currently being used by the recipient's inbox may include read email messages, unread messages, archived email messages and spam email messages. The difference between the total allocated storage space and the allocated storage space currently being used provides the amount of unused allocated storage space available in database 124.

Message scaling program 122 determines the amount of storage space needed for the time period in which the recipient will be unavailable to access their associated inbox (step 206). The amount of allocated storage space which will be needed for the inbox of the recipient is determined based on the average amount of email messages the recipient receives for duration of the time period selected. In the example from above, the time period the recipient is unavailable is a single work week. To determine the average amount of email messages received during that time, an equivalent time period, for example, a prior single work week, can be selected. The amount of email messages received during the other prior single work week can be used to estimate the amount of allocated storage space which will be needed to store any email messages received while the recipient is unavailable. The prior single work week selected can be the same single work week selected by the recipient but from the previous year. In another example, the prior single work week selected can be the work week preceding the single work week in which the recipient will be unavailable. In another example, the prior single work week selected can be the average amount of email messages received during a random single work week in the past, or an average amount of emails received in a work week determined from a plurality of previous work weeks.

Message scaling program 122 determines if there is enough available storage space in the recipient's inbox (step 208) based on the estimated storage space needed for the time period. In the event there is enough storage space in the recipient's inbox to receive email messages during the time period in which the recipient will be unavailable to access their associated inbox (yes branch, step 208), message scaling program 122 notifies the recipient there is sufficient storage space to store any email messages received (step 210). In the event there is not enough storage space in the recipient's inbox to receive emails during the time period in which the recipient will be unavailable to access their associated inbox (no branch, step 208), message scaling program 122 determines the additional amount of storage space needed (step 212). The difference between the estimated amount of the allocated storage space which is needed to store any email messages received during the single work week and the amount of unused allocated storage space available in database 124 provides the amount of additional storage space needed.

Message scaling program 122 notifies the recipient of the additional storage space needed (step 214). Upon the recipient receiving the notification, the recipient can, for example, access their associated inbox to select any existing email messages for deletion to create additional storage space in the allocated storage space. Message scaling program 122 receives the selection of existing email messages in the recipient's inbox to delete from the allocated memory (step 216). After deletion of the selected messages, message scaling program 122 returns to determine if there is enough storage space available in database 124.

Figure 3:
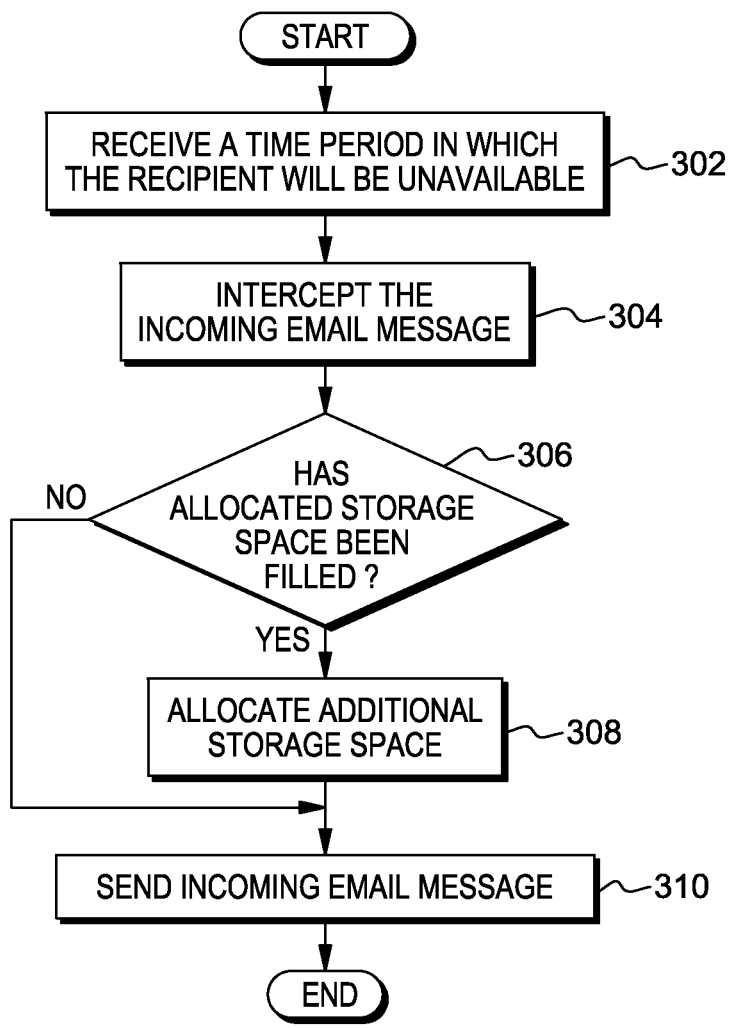
FIG. 3 is a flowchart depicting operational steps of the message scaling program of FIG. 2, for allocating memory storage space for an inbox in a messaging program, according to an alternate embodiment of the present invention.

FIG. 3 is a flowchart depicting operational steps of an alternative implementation of message scaling program 122 for scaling an inbox in a messaging program for a recipient of an email, according to an alternate embodiment of the present invention.

In this alternative embodiment, a recipient with client computer device 106 is scheduled to be "out of the office" and unavailable to access their associated inbox in client message program 110 to read email messages. In the event the allocated storage space in database 124 for the recipient's inbox is fully utilized (or becomes fully utilized) while the recipient is unavailable to access their associated inbox to read email messages, additional storage space can be temporarily allocated for the inbox.

In the alternative embodiment, message scaling program 122 receives a time period in which the recipient is unavailable to access their associated inbox to read email messages (step 302). In this example, the time period is a single work week. Prior to any incoming email messages being delivered to the inbox associated with the recipient, message scaling program 122 intercepts the incoming email message (step 304). The incoming email message is sent by a sender using client computer device 104 to a recipient on client computer device 106. Message scaling program 122 intercepts any incoming email during the time period in which the recipient is unavailable. Message scaling program 122 determines if the allocated storage space of the inbox has been filled (step 306). Upon determining the allocated storage space for the inbox has not been filled (no branch, step 306), message scaling program 122 sends the incoming email message to the inbox (step 310). Upon determining the allocated storage space for the inbox has been filled (yes branch, step 306), message scaling program 122 temporarily allocates additional storage space for the inbox (step 308). In this example, additional storage space for the inbox can be provided from database 124. The temporary allocation of the additional storage space can be performed until the recipient becomes available to access their associated inbox to read email messages and delete existing messages to reduce the amount of allocated storage space being used. In one example, an additional amount of storage space can be designated in database 124 for instances when a recipient needs temporary storage space allocation. When temporary storage space is needed to store an incoming email message, message scaling program 122 can request for the storage space and the additional storage space can be utilized. However, once the recipient has access to their associated inbox, message scaling program 122 prompts the recipient to delete messages in the box which are equivalent in storage space to the temporary storage space allocated. Message scaling program 122 can have the ability to monitor what storage space is used and determine whether the storage space is temporary.

In the alternative embodiment, the recipient can have the ability to set preferences in message scaling program 122 to automatically reject the intercepted incoming email messages, which results in the email messages not being delivered to the inbox associated with the recipient. Message scaling program 122 can reject an intercepted incoming email based on the storage size required to store the email message in the allocated storage memory. For example, the recipient can set a preference where any incoming email message is rejected if the email message is of a size greater than 2 megabits (MB) and any incoming email message of a size less than 2 MB is delivered to the inbox associated with the recipient.

Figure 4:
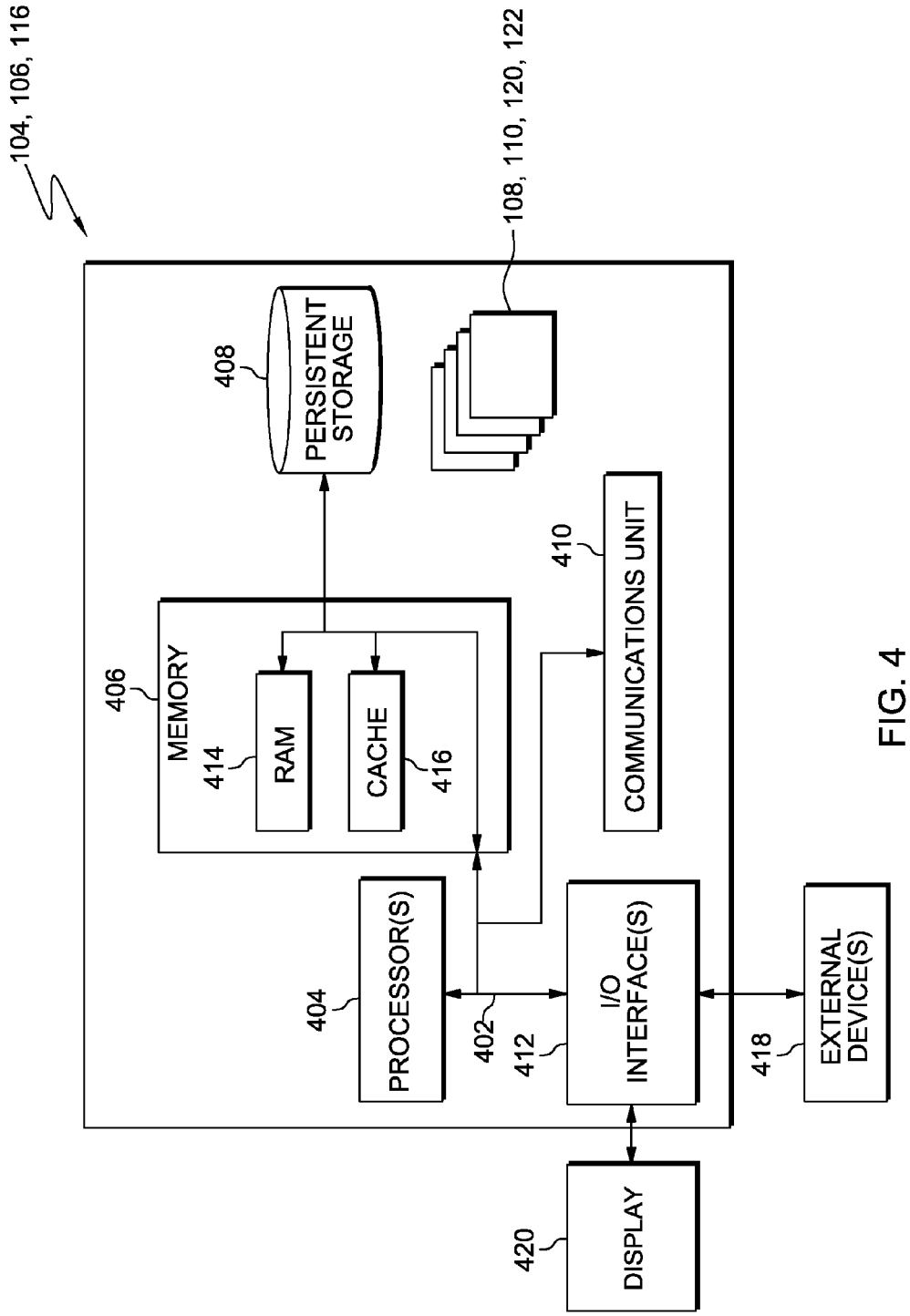
FIG. 4 depicts a block diagram of components of either of the client computer devices of FIG. 1 for executing the message scaling program, in accordance with an embodiment of the present invention.

FIG. 4 depicts a block diagram of components of client computer device 104 or 106 and server 116 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computer device 104, client computer device 106 and server 116 can include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Client message program 108, client message program 110, server message program 120, and message scaling program 122 can be stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

In these examples, communications unit 410 includes one or more network interface cards. Communications unit 410 may provide communications through the use of either or both physical and wireless communications links. Client message program 108, client message program 110, server message program 120, and message scaling program 122 may be downloaded to persistent storage 408 through communications unit 410.

I/O interface(s) 412 allows for input and output of data with other devices that may be connected to client computer device 104, client computer device 106 and server 116. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., client message program 108, client message program 110, server message program 120, and message scaling program 122 can be stored on such portable computer-readable storage media and can be loaded onto persistent storage 408 via I/O interface(s) 412. I/O interface(s) 412 also connect to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing storage space for electronic messages, the method comprising:

receiving a selected time period in which a user of a messaging program will not be able to access electronic messages through the messaging program;

determining, by one or more computer processors, a first amount of storage space previously required to store electronic messages received during a first time period equal in duration to the selected time period at a similar point in time in a first previous year;

determining, by one or more computer processors, a second amount of storage space previously required to store electronic messages received during a second time period equal in duration to the selected time period at the similar point in time in a second previous year, wherein the first previous year is different from the second previous year;

estimating, by one or more computer processors, a required amount of storage space to store electronic messages received during the selected time period, wherein the required amount of storage space is equal to an average of the first amount of storage space and the second amount of storage space;

determining, by one or more computer processors, that an unused portion of storage space allocated to the user is less than the estimated storage space required;

determining, by one or more computer processors, an amount of additional storage space required to meet the estimated required storage space for the selected time period; and notifying the user of the amount of additional storage space required.

2. The method of claim 1, wherein notifying the user of the amount of allocated storage space requested, comprises suggesting the user delete one or more previously stored electronic messages.

3. The method of claim 1, further comprising:

determining an electronic message has been sent during the selected time period;

determining that the amount of unused portion of storage space allocated to the user is less than the storage space required to store the electronic message;

allocating temporary storage space to the user to store the electronic message;

determining the user has access to electronic messages through the messaging program; and requiring the user to delete one or more of the electronic messages related in storage space to the temporarily allocated storage space.

4. A computer program product for managing storage space for electronic messages, the computer program product comprising:
one or more computer-readable storage media and program instructions stored on the one or more computer-readable storage media, wherein the one or more computer-readable storage media is not a transitory signal per se, the program instructions comprising:
program instructions to receive a selected time period in which a user of a messaging program will not be able to access electronic messages through the messaging program;
program instructions to determine a first amount of storage space previously required to store electronic messages received during a first time period equal in duration to the selected time period at a similar point in time in a first previous year;
program instructions to determine a second amount of storage space previously required to store electronic messages received during a second time period equal in duration to the selected time period at a similar point in time in a second previous year, wherein the first previous year is different from the second previous year;
program instructions to estimate, a required amount of storage space to store electronic messages received during the selected time period, wherein the required amount of storage space is equal to an average of the first amount of storage space and the second amount of storage space;
program instructions to determine, that an unused portion of storage space allocated to the user is less than the estimated storage space required;
program instructions to determine an amount of additional storage space required to meet the estimated required storage space for the selected time period; and
program instructions to notify the user of the amount of additional storage space required.

5. The computer program product of claim 4, wherein program instructions to notify the user of the amount of allocated storage space requested, comprises program instructions, stored on the one or more computer-readable storage media, which when executed by a processor, cause the processor to suggest the user delete one or more previously stored electronic messages.

6. The computer program product of claim 4, further comprising program instructions, stored on the one or more computer-readable storage media, which when executed by a processor, cause the processor to:
determine an electronic message has been sent during the selected time period;
determine that the amount of unused portion of storage space allocated to the user is less than the storage space required to store the electronic message;
allocate temporary storage space to the user to store the electronic message;
determine the user has access to electronic messages through the messaging program; and
require the user to delete one or more of the electronic messages related in storage space to the temporarily allocated storage space.

7. A computer system for managing storage space for electronic messages, the computer system comprising:
one or more processors;
one or more computer-readable storage media, wherein the one or more computer-readable storage media are not transitory signals per se;
program instructions stored on the one or more computer-readable storage media for execution by at least one of the one or more processors, the program instructions comprising:
program instructions to receive a selected time period in which a user of a messaging program will not be able to access electronic messages through the messaging program;
program instructions to determine a first amount of storage space previously required to store electronic messages received during a first time period equal in duration to the selected time period at a similar point in time in a first previous year;
program instructions to determine a second amount of storage space previously required to store electronic messages received during a second time period equal in duration to the selected time period at a similar point in time in a second previous year, wherein the first previous year is different from the second previous year;
program instructions to estimate a required amount of storage space to store electronic messages received during the selected time period, wherein the required amount of storage space is equal to an average of the first amount of storage space and the second amount of storage space;
program instructions to determine that an unused portion of storage space allocated to the user is less than the estimated storage space required;
program instructions to determine an amount of additional storage space required to meet the estimated required storage space for the selected time period; and
program instructions to notify the user of the amount of additional storage space required.

8. The computer system of claim 7, wherein program instructions to notify the user of the amount of allocated storage space requested, comprises program instructions, stored on the one or more computer-readable storage media, which when executed by a processor, cause the processor to suggest the user delete one or more previously stored electronic messages.

9. The computer system of claim 7, further comprising program instructions, stored on the one or more computer-readable storage media, which when executed by a processor, cause the processor to:
determine an electronic message has been sent during the selected time period;
determine that the amount of unused portion of storage space allocated to the user is less than the storage space required to store the electronic message;
allocate temporary storage space to the user to store the electronic message;
determine the user has access to electronic messages through the messaging program; and
require the user to delete one or more of the electronic messages related in storage space to the temporarily allocated storage space.

* * * * *